(12) United States Patent
Sakakibara

(10) Patent No.: US 8,374,005 B2
(45) Date of Patent: *Feb. 12, 2013

(54) DIRECT AC POWER CONVERTING APPARATUS

(75) Inventor: Kenichi Sakakibara, Shiga (JP)

(73) Assignee: Daikin Industries, Ltd., Osaka (JP)

( * ) Notice: Subject to any disclaimer, the term of this patent is extended or adjusted under 35 U.S.C. 154(b) by 315 days.

This patent is subject to a terminal disclaimer.

(21) Appl. No.: 12/812,892

(22) PCT Filed: Feb. 3, 2009

(86) PCT No.: PCT/JP2009/051751
§ 371 (c)(1),
(2), (4) Date: Jul. 14, 2010

(87) PCT Pub. No.: WO2009/107461
PCT Pub. Date: Sep. 3, 2009

(65) Prior Publication Data
US 2010/0296321 A1    Nov. 25, 2010

(30) Foreign Application Priority Data
Feb. 28, 2008 (JP) .................... 2008-047897

(51) Int. Cl.
*H02M 5/40* (2006.01)
(52) U.S. Cl. .......... 363/34; 363/132; 363/159; 318/722
(58) Field of Classification Search .............. 363/34–41, 363/56.01, 58–60, 89, 97, 98, 131.132, 159; 307/64–66, 105, 106, 108; 318/722, 800–811; 361/18, 42, 44, 90, 91
See application file for complete search history.

(56) References Cited

U.S. PATENT DOCUMENTS

| | | | |
|---|---|---|---|
| 6,018,473 A * | 1/2000 | Claassen | 363/128 |
| 6,118,676 A * | 9/2000 | Divan et al. | 363/34 |
| 6,198,240 B1 * | 3/2001 | Notohara et al. | 318/268 |
| 6,236,584 B1 * | 5/2001 | Koo | 363/143 |
| 6,995,992 B2 | 2/2006 | Wei et al. | |
| 7,375,991 B2 * | 5/2008 | Shin | 363/59 |
| 2006/0033466 A1 | 2/2006 | Yamada et al. | |
| 2011/0007531 A1 | 1/2011 | Sakakibara | |

FOREIGN PATENT DOCUMENTS

| | | |
|---|---|---|
| JP | 2-65667 A | 3/1990 |
| JP | 5-292759 A | 11/1993 |
| JP | 7-289766 A | 11/1995 |

(Continued)

OTHER PUBLICATIONS

Wei, Lixiang et al. "Investigation of 9-switch Dual-bridge Matrix Converter Operating under Low Output Power Factor," IEEE, vol. 1, pp. 176-191, 2003.

*Primary Examiner* — Rajnikant Patel
(74) *Attorney, Agent, or Firm* — Birch, Stewart, Kolasch & Birch, LLP

(57) ABSTRACT

A control section controls a current-source converter while a switch is conducting, to render conducting a pair of a high-aim side transistor and a low-arm side transistor (for example, transistors) which are connected to any one of input lines, performs voltage doubler rectification on a voltage between a neutral phase input line on which a resistor is provided and any one of the input lines, to serve for charging of clamp capacitors.

6 Claims, 10 Drawing Sheets

FOREIGN PATENT DOCUMENTS

| | | |
|---|---|---|
| JP | 8-79963 A | 3/1996 |
| JP | 11-285253 A | 10/1999 |
| JP | 11-332239 A | 11/1999 |
| JP | 2000-341967 A | 12/2000 |
| JP | 2001-145395 A | 5/2001 |
| JP | 2005-110336 A | 4/2005 |
| JP | 2006-54947 A | 2/2006 |
| KR | 10-2010-0033436 A | 3/2010 |

* cited by examiner

F I G . 1
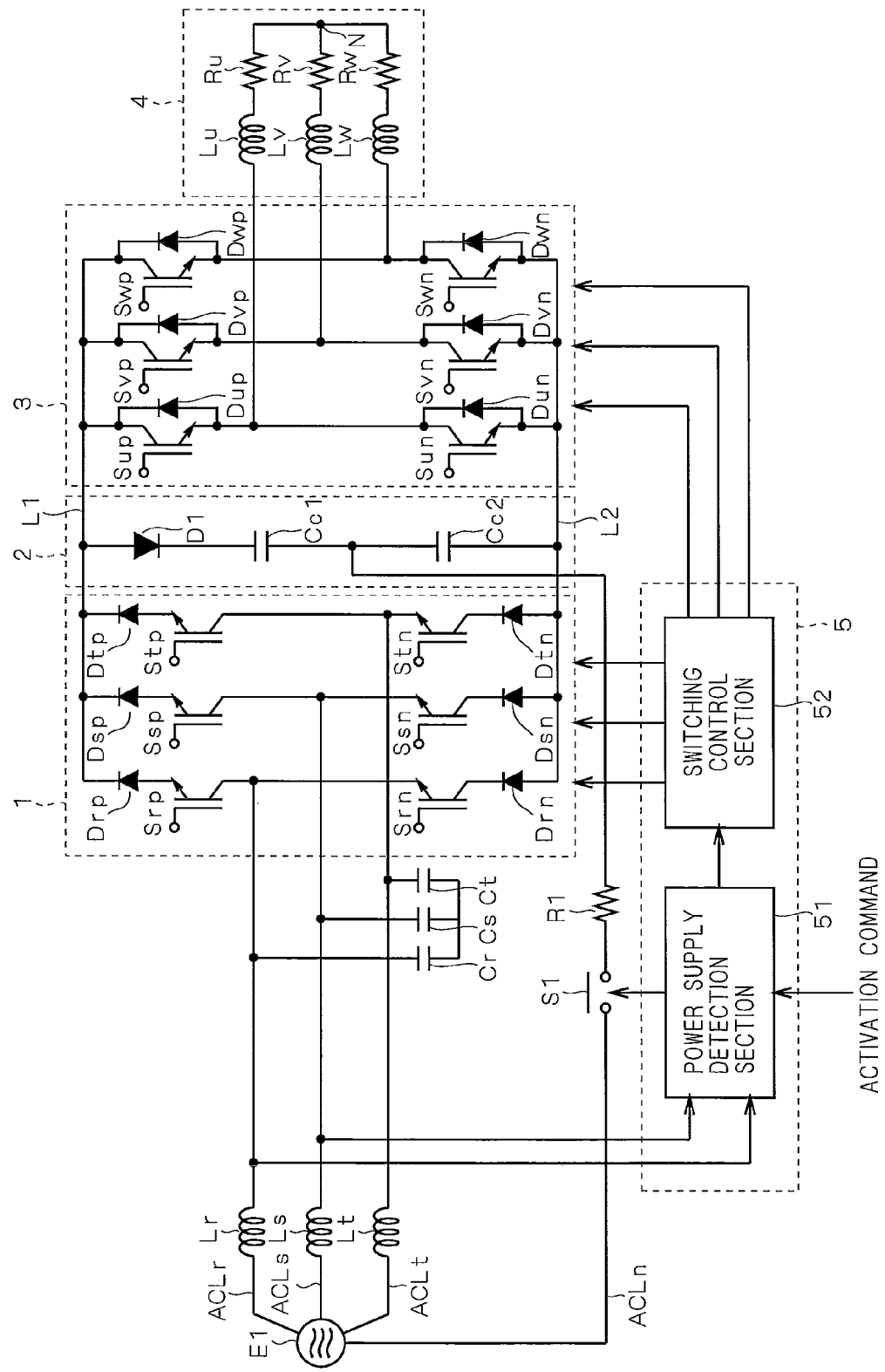

F I G . 7
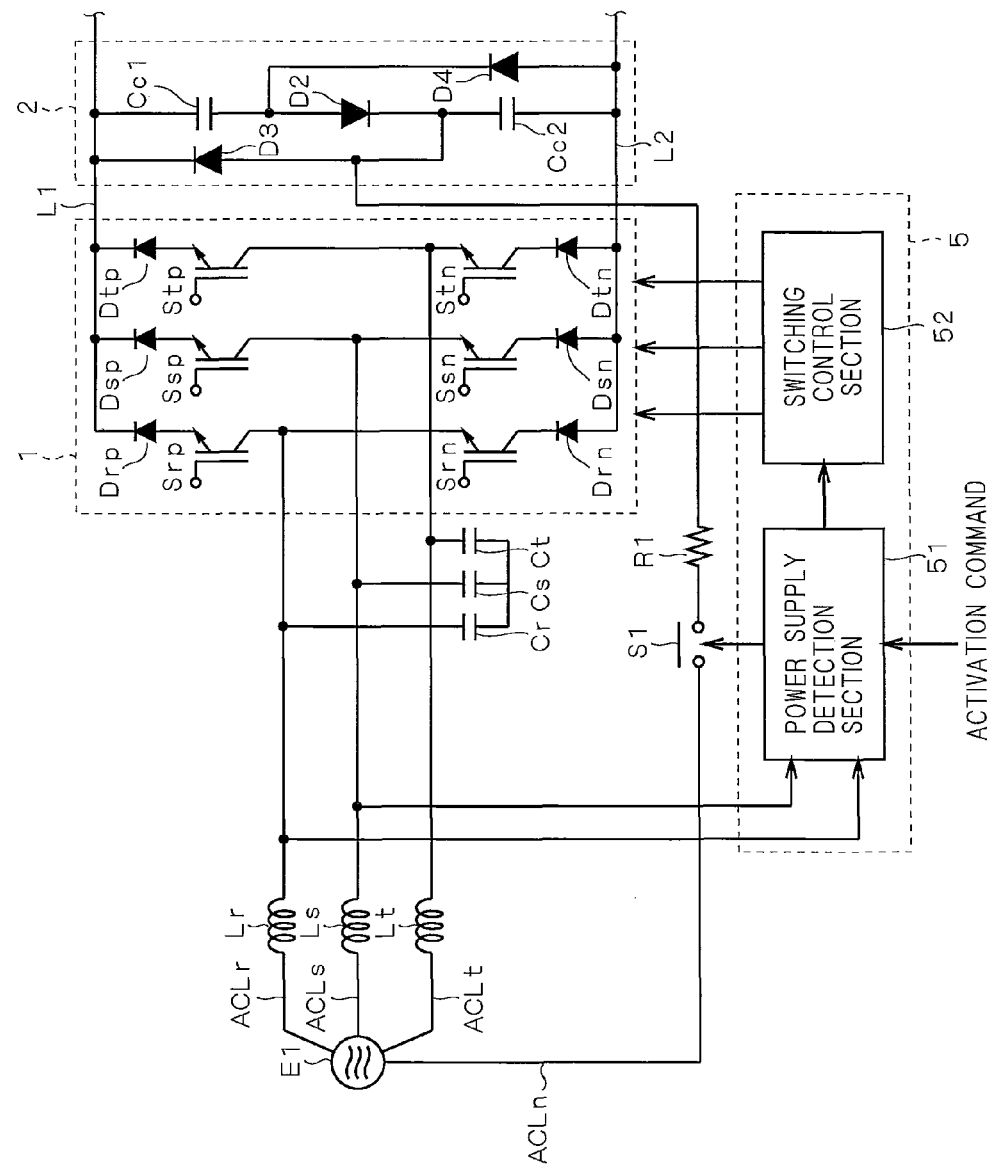

DIRECT AC POWER CONVERTING APPARATUS

TECHNICAL FIELD

The present invention relates to a direct AC power converting apparatus, and particularly to a technique for preventing an inrush current to a capacitor included in the direct AC power converting apparatus.

BACKGROUND ART

Lixiang Weigh, and Thomas A. Lipo, "Investigation of 9-switch Dual-bridge Matrix Converter Operating under Low Output Power Factor", U.S.A., IEEE ISA2003, vol. 1, pp. 176-181 which will be described later discloses a direct AC power converting apparatus including a clamp circuit. FIG. 12 shows the direct AC power converting apparatus disclosed in the Lixiang Weigh, and Thomas A. Lipo, "Investigation of 9-switch Dual-bridge Matrix Converter Operating under Low Output Power Factor", U.S.A., IEEE ISA2003, vol. 1, pp. 176-181.

For the convenience of description in the present application, the reference characters in the figure do not always coincide with those in the Lixiang Weigh, and Thomas A. Lipo, "Investigation of 9-switch Dual-bridge Matrix Converter Operating under Low Output Power Factor", U.S.A., IEEE ISA2003, vol. 1, pp. 176-181.

It is assumed that an IPM motor is provided at an output side of the direct AC power converting apparatus. When an inductance per phase which corresponds to the average value of an effective inductance of the IPM motor is defined as La, an overload current serving as a criterion for interrupting a current supply to the IPM motor is defined as i, a voltage between both ends of the clamp capacitor is defined as Vc, an electrostatic capacitance of the clamp capacitor is defined as Cc, an line voltage of a three-phase AC power source is defined as Vs, and it is assumed that all the power stored in three-phase inductors included in the IPM motor is regenerated to the clamp capacitor; the following relational expression is satisfied.

[Math. 1]

$$\frac{1}{2}La\left(i^2+\left(\frac{i}{2}\right)^2+\left(\frac{i}{2}\right)^2\right)=\frac{1}{2}Cc\left(Vc^2-\left(\sqrt{2}\,Vs\right)^2\right) \quad (1)$$

Accordingly, the voltage between both ends of the clamp capacitor is represented by the following expression.

[Math. 2]

$$Vc=\sqrt{\frac{3}{2}\frac{La}{Cc}i^2+2Vs^2} \quad (2)$$

FIG. 13 is a graph based on the expression (2), showing a relationship of the voltage between both ends of the clamp capacitor relative to the electrostatic capacitance of the clamp capacitor. For example, when the power supply voltage Vs is 400 V, the inductance La is 12 mH, the overload current i is 40 A, and the electrostatic capacitance of the clamp capacitor is 10 μF, the voltage Vc between both ends of the clamp capacitor is approximately 1800 V. The voltage value exceeds 1200 V which is the device rating of a transistor or a diode for 400V class of power supply voltage.

In order to suppress the voltage Vc between both ends of the clamp capacitor to approximately 750 V for example, the electrostatic capacitance of the clamp capacitor has to be equal to or larger than 200 μF, based on the expression (2) and FIG. 13.

On the other hand, as the electrostatic capacitance of the clamp capacitor is larger, an inrush current caused at the time of power-on increases. To be specific, for example, a series circuit in which a power source, a reactor, a resistor, and a capacitor are connected in series, is assumed as a one-phase series circuit. When an inductance of the reactor is defined as L, a resistance value of the resistor is defined as R, and an electrostatic capacitance of the clamp capacitor is defined as C, transmission characteristics of an output (current) relative to an input (power supply voltage Vs) in the series circuit is represented by the following expression.

[Math. 3]

$$G(s)=\frac{ic}{Vs}=sC\frac{1/LC}{s^2+sR/L+1/LC} \quad (3)$$

By obtaining a response to a step input, the following expression is derived.

[Math. 4]

$$G(s)=sC\frac{1/LC}{s^2+sR/L+1/LC}\frac{1}{s}=\frac{1/L}{s^2+sR/L+1/LC} \quad (4)$$

Here, by performing an inverse Laplace transform to the expression (4) with 1/L=D, R/L=E, and 1/LC=F, the following expression is derived.

[Math. 5]

$$i(t)=\frac{D}{\omega}e^{-\sigma t}\sin\omega t \quad (5)$$

[Math. 6]

$$\omega=\frac{\sqrt{4F-E^2}}{2},\quad \sigma=\frac{E}{2} \quad (6)$$

As the electrostatic capacitance C of the capacitor is larger, F decreases. D and E do not depend on the electrostatic capacitance C, and are constant. Therefore, as the electrostatic capacitance C of the capacitor is larger, ω decreases. Accordingly, as the electrostatic capacitance C of the capacitor is larger, the amplitude term D/ω excluding attenuation over time has a greater value. That is, the inrush current increases with the increase in the electrostatic capacitance C of the capacitor.

By obtaining the maximum value of the current when a value obtained by differentiating i(t) by time is 0 (i(t)'=0) based on the expression (5), the following expression is derived.

[Math. 7]

$$t = \frac{\pi - \alpha}{\omega} \quad (7)$$

At this time, the current has the maximum value. This maximum value can be recognized as the inrush current. FIG. 14 is a graph showing a relationship of the inrush current ($i((\pi-\alpha)/\omega)$) relative to the electrostatic capacitance C.

As described above, when the electrostatic capacitance of the clamp capacitor is set at 200 μF in order to suppress the voltage between both ends of the clamp capacitor charged by a regenerative current to approximately 750 V, the maximum value (inrush current) of the current reaches 150 A, based on the expressions (6) and (7).

As techniques related to the present invention, Specification of U.S. Pat. No. 6,995,992, Japanese Patent Application Laid-Open No. 2006-54947, Japanese Patent Application Laid-Open No. 8-079963 (1996), and Japanese Patent Application Laid-Open No. 2-65667 (1990) are disclosed.

DISCLOSURE OF THE INVENTION

Problems to be Solved by the Invention

As described above, there is a problem that an inrush current into a clamp capacitor is increased when an electrostatic capacitance of the clamp capacitor is increased in order to suppress an increase in a voltage between both ends of the clamp capacitor which may be caused by a regenerative current.

Therefore, an object of the present invention is to provide a direct AC power converting apparatus capable of reducing an inrush current while preventing an increase in a voltage between both ends of a capacitor by increasing an electrostatic capacitance of the capacitor.

Means for Solving the Problems

A first aspect of a direct AC power converting apparatus according to the present invention is directed to a direct AC power converting apparatus including a plurality of input lines (ACLr, ACLs, ACLt), a positive-side DC power supply line (L1), a negative-side DC power supply line (L2), a current-source power converter (1), a plurality of input capacitors (Cr, Cs, Ct), a first diode (D1), first and second capacitors (Cc1, Cc2), a neutral phase input line (ACLn), a switch (S1), a voltage-source power converter (3), a resistor (R1), and a control section (5). To the plurality of input lines (ACLr, ACLs, ACLt), an output of a multi-phase AC power source (E1) including a neutral point is given. To the negative-side DC power supply line (L2), applied is a potential lower than a potential applied to the positive-side DC power supply line. The current-source power converter (1) includes high-arm side switching elements (Drp+Srp, Dsp+Ssp, Dtp+Stp) and low-arm side switching elements (Drn+Srn, Dsn+Ssn, Dtn+Stn). Each of the high-arm side switching elements has a reverse blocking capability and is connected between the positive-side DC power supply line and corresponding one of the input lines. Each of the low-arm side switching elements has a reverse blocking capability and is connected between the negative-side DC power supply line and corresponding one of the input lines. The current-source power converter converts a multi-phase AC voltage applied between ones of the input lines into a square-waveform DC voltage having two potentials by a selection operation of the high-arm side switching elements and the low-arm side switching elements, and supplies the DC voltage to between the positive-side DC power supply line and the negative-side DC power supply line. Each of the plurality of input capacitors (Cr, Cs, Ct) is provided between the ones of the input lines and functions as a voltage source. The first diode (D1) is provided between the positive-side DC power supply line and the negative-side DC power supply line, and has an anode at a positive-side DC power supply line side and a cathode at a negative-side DC power supply line side. The first and second capacitors (Cc1, Cc2) are connected, between the positive-side DC power supply line and the negative-side DC power supply line, in series with the first diode. The neutral phase input line (ACLn) connects the neutral point and a point between the first capacitor and the second capacitor. The switch (S1) is inserted in the neutral phase input line. The voltage-source power converter (3) converts the DC voltage into a square-waveform AC voltage and outputs the AC voltage to an inductive multi-phase load (4). The resistor (R1) is inserted in any one of the plurality of input lines and the neutral phase input line. The control section (5) renders conducting the high-arm side switching element and the low-arm side switching element which are connected to the same one of the input lines while the switch is conducting, to serve for charging of the first capacitor and the second capacitor via the resistor, and renders the switch non-conducting after a predetermined time period elapses.

A second aspect of the direct AC power converting apparatus according to the present invention is directed to the direct AC power converting apparatus of the first aspect, in which the resistor (R1) is provided on the neutral phase input line (ACLn).

A third aspect of the direct AC power converting apparatus according to the present invention is directed to the direct AC power converting apparatus of the first aspect, in which the resistor (R1) is provided on one of the input lines (ACLr, ACLs, ACLt), and the direct AC power converting apparatus further includes a reactor (Lr, Ls, Lt) connected in parallel with the resistor.

A fourth aspect of the direct AC power converting apparatus according to the present invention is directed to the direct AC power converting apparatus of any one of the first to third aspects, in which: the first capacitor (Cc1) is provided at a positive-side DC power supply line side relative to the second capacitor (Cc2), and the first diode (D2) is provided between the first capacitor and the second capacitor; and the direct AC power converting apparatus further includes a second diode (D3) and a third diode (D4). The second diode (D3) has an anode connected to a point between the first diode and the second capacitor, and a cathode connected to the positive-side DC power supply line. The third diode (D4) has an anode connected to the negative-side DC power supply line, and a cathode connected to a point between the first diode and the first capacitor.

EFFECTS OF THE INVENTION

In the first aspect of the direct AC power converting apparatus according to the present invention, an inrush current is prevented from flowing from the multi-phase AC power source to the first capacitor and the second capacitor at a time of an initial operation of the current-source power converter. At this time, the input capacitor is not electrically connected to the first capacitor and the second capacitor.

When a pair of the high-arm side switching element and the low-arm side switching element which are connected to one input line is rendered conducting while the switch is conducting, the current-source power converter, together with the neutral phase input line, the first capacitor, and the second capacitor, equivalently forms a voltage doubler rectification circuit. Therefore, a voltage between both ends of a pair of the first capacitor and the second capacitor after being charged has a value twice as high as a voltage value of the multi-phase AC power source.

After the switch is rendered non-conducting, the current-source power converter converts a multi-phase AC current flowing among the input lines into a DC current, and supplies the DC current to the first capacitor and the second capacitor. Therefore, the input capacitor is connected in parallel with the first capacitor and the second capacitor. A voltage between both ends of the input capacitor corresponds to a line voltage of the input line, and has a value √3 as high as a voltage value of the multi-phase AC power source.

The voltage between both ends of a pair of the first capacitor and the second capacitor is higher than the voltage between both ends of the input capacitor. Therefore, an inrush current can be effectively prevented from flowing from the input capacitor to the first capacitor and the second capacitor in a case where the input capacitor is connected in parallel with the first capacitor and the second capacitor. In the second aspect of the direct AC power converting apparatus according to the present invention, the resistor is provided on the neutral phase input line. Therefore, by using any input line, the DC current can be supplied to the first capacitor and the second capacitor via the resistor.

In the third aspect of the direct AC power converting apparatus according to the present invention, a carrier current component removal filter that removes a carrier current component can be formed with the reactor and the input capacitor. Additionally, since the resistor and the reactor are connected in parallel, voltage pulsations of the input capacitor, which may occur at an initial stage of charging (at a transient time), can be reduced.

In the fourth aspect of the direct AC power converting apparatus according to the present invention, the first capacitor and the second capacitor are charged in a series-connection state and discharged in a parallel-connection state, due to a rectifying function of the first to third diodes. The first capacitor and the second capacitor are charged with a regenerative current from the inductive multi-phase load, and discharged when a voltage between both ends of each of the first and second capacitor exceeds a voltage value determined based on a load power factor at the voltage-source power converting apparatus side. That is, since a discharging path can be ensured by using the first capacitor and the second capacitor, an operation equivalent to the operation of the mode disclosed in Lixiang Weigh, and Thomas A. Lipo, "Investigation of 9-switch Dual-bridge Matrix Converter Operating under Low Output Power Factor", U.S.A., IEEE ISA2003, vol. 1, pp. 176-181 can be realized even though the path is a passive circuit.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a diagram conceptually showing an exemplary configuration of a motor driving device according to a first embodiment;

FIG. 7 is a diagram conceptually showing another exemplary configuration of the motor driving device according to the first embodiment;

BEST MODE FOR CARRYING OUT THE INVENTION

First Embodiment

Figure 2:
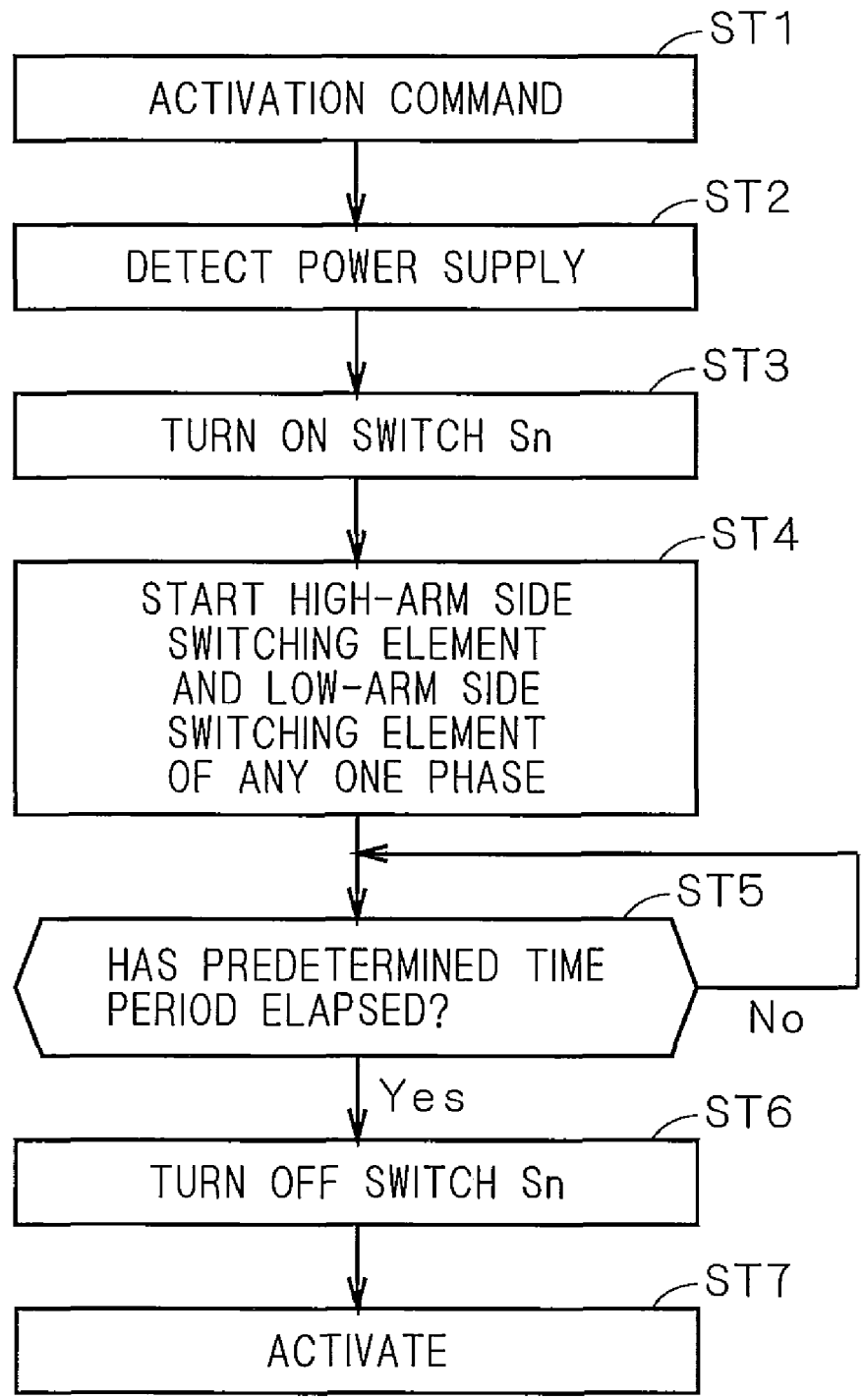
FIG. 2 is a flowchart showing an operation of a control section.

As an example of a direct AC power converting apparatus according to a first embodiment of the present invention, a conceptual configuration of a motor driving device is shown in FIG. 1. The motor driving device includes a power source E1, input lines ACLr, ACLs, ACLt, a neutral phase input line ACLn, reactors Lr, Ls, Lt, capacitors Cr, Cs, Ct, a current-source converter 1, DC power supply lines L1, L2, a clamp circuit 2, a voltage-source inverter 3, a motor 4, a control section 5, a resistor R1, and a switch S1.

The power source E1 is a multi-phase AC power source having a neutral point (not shown), and for example, is a three-phase AC power source. An output of the power source E1 is given to the input lines ACLr, ACLs, ACLt.

The reactors Lr, Ls, Lt are provided on the input lines ACLr, ACLs, ACLt, respectively.

The capacitors Cr, Cs, Ct are provided among the respective input lines ACLr, ACLs, ACLt, by being Y-connected with one another, for example. Specifically, the capacitors Cr, Cs are connected in series between the input lines ACLr, ACLs. The capacitors Cs, Ct are connected in series between the input lines ACLs, ACLt. The capacitors Ct, Cr are connected in series between the input lines ACLt, ACLr. They are provided at the input side of the current-source converter 1, and function as a voltage source. The capacitors Cr, Cs, Ct can be recognized as input capacitors. On the other hand, it can also be recognized that the capacitors Cr, Cs, Ct cooperate with the reactors Lr, Ls, Lt, respectively, to form a carrier current component removal filter for removing a carrier current component.

The current-source converter 1 has a plurality of switching elements. By selectively operating the plurality of switching elements, the current-source converter 1 converts three-phase AC voltages applied among the input lines ACLr, ACLs, ACLt into a square-waveform DC voltage having two potentials to supply the DC voltage between the DC power supply lines L1, L2. The DC power supply line L1 can be recognized as a positive-side DC power supply line, and the DC power supply line L2 can be recognized as a negative-side DC power supply line to which applied is a potential lower than a potential applied to the DC power supply line L1.

More specifically, the current-source converter 1 includes high-arm side transistors Srp, SsP, Stp, low-arm side transistors Sm, Ssn, Stn, and diodes Drp, Drn, Dsp, Dsn, Dtp, Dtn. In the following description, the high-arm side transistor and the low-arm side transistor are simply called "transistors".

The cathode of each of the diodes Drp, Dsp, Dtp is connected to the DC power supply line L1, and the anode of each of the diodes Drn, Dsn, Dtn is connected to the DC power supply line L2.

The emitters of the transistors Srp, Ssp, Stp are connected to the anodes of the diodes Drp, Dsp, Dtp, respectively, and the collectors of the transistors Sm, Ssn, Stn are connected to the cathodes of the diodes Drn, Dsn, Dtn. The collector of the transistor Srp and the emitter of the transistor Sm are commonly connected to the input line ACLr. The collector of the transistor Ssp and the emitter of the transistor Ssn are commonly connected to the input line ACLs. The collector of the transistor Stp and the emitter of the transistor Stn are commonly connected to the input line ACLt. A pair of a transistor and a diode that is connected in series with the transistor (for example, a pair of the transistors Srp and the diode Drp) can be recognized as a switching element having a reverse blocking capability.

The control section 5 gives a switching signal to the base of each of the transistors Srp, Sm, Ssp, Ssn, Stp, Stn, so that the current-source converter 1 converts the three-phase AC voltages into the square-waveform DC voltage having two potentials.

The clamp circuit 2 includes clamp capacitors Cc1,Cc2, and a diode D1. The diode D1 is provided between the DC power supply lines L1, L2, and has the anode thereof connected to the DC power supply line L1 side and the cathode thereof connected to the DC power supply line L2 side. Each of the clamp capacitors Cc1, Cc2 is connected in series with the diode D1. The clamp capacitors Cc1, Cc2, and the diode D1 are connected in series with one another. The clamp circuit 2 of this type can suppress an increase in the voltage between the DC power supply lines L1, L2, which may be caused by a return current flowing from the voltage-source inverter 3 to the current-source converter 1. Additionally, since the clamp capacitors Cc1, Cc2 divide the voltage between the DC power supply lines L1, L2, the voltage between both ends of each clamp capacitor Cc1, Cc2 can be reduced.

The neutral phase input line ACLn connects the neutral point of the power source E1 to a point between the clamp capacitors Cc1, Cc2. The resistor R1 is inserted in the neutral phase input line ACLn. The switch S1 is provided on the neutral phase input line ACLn and in series with the resistor R1.

The voltage-source inverter 3 converts the square-waveform DC voltage between the DC power supply lines L1, L2, into a square-waveform AC voltage, and outputs the AC voltage to the motor 4. More specifically, the voltage-source inverter 3 includes high-arm side transistors Sup, Svp, Swp, low-arm side transistors Sun, Svn, Swn, and diodes Dup, Dun, Dvp, Dvn, Dwp, Dwn.

The collectors of the transistors Sup, Svp, Swp, and the cathodes of the diodes Dup, Dvp, Dwp are connected to the DC power supply line L1. The emitters of the transistors Sun, Svn, Swn, and the anodes of the diodes Dun, Dvn, Dwn are connected to the DC power supply line L2.

The emitter of the transistor Sup, the collector of the transistor Sun, the anode of the diode Dup, and the cathode of the diode Dun are commonly connected to the motor 4. The emitter of the transistor Svp, the collector of the transistor Svn, the anode of the diode Dvp, and the cathode of the diode Dvn are commonly connected to the motor 4.

The emitter of the transistor Swp, the collector of the transistor Swn, the anode of the diode Dwp, and the cathode of the diode Dwn are commonly connected to the motor 4.

For example, the control section 5 gives a switching signal to the base of each of the transistors Sup, Sun, Svp, Svn, Swp, Swn, so that the voltage-source inverter 3 converts the square-waveform DC voltage between the DC power supply lines L1, L2, into a square-waveform AC voltage, and outputs the AC voltage to the motor 4.

The motor 4 is for example a three-phase AC motor. An inductance component and a resistorance component of the motor 4 are represented by coils Lu, Lv, Lw and resistors Ru, Rv, Rw, respectively. The resistors Ru, Rv, Rw are connected in series with the coils Lu, Lv, Lw, respectively. These series connections correspond to the respective phases of the motor 4. One ends of the series connections are connected to a point between the transistors Sup, Sun, to a point between the transistors Svp, Svn, and to a point between the transistors Swp, Swn, respectively. The other ends of the series connections are commonly connected at a neutral point N.

The square-waveform AC voltage is given from the voltage-source inverter 3, and the AC current that drives the motor 4 is smoothed due to the inductance component of the motor 4. In other words, the motor 4 converts the square-waveform AC voltage, which is given from the voltage-source inverter 3, into an AC current. The AC current flowing in the motor 4 charges the capacitors Cr, Cs, Ct via the voltage-source inverter 3 and the current-source converter 1, and is converted into an AC voltage. In other words, the motor 4 can be recognized as a current source with respect to the current-source converter 1.

The control section 5 controls a selection operation of the switch S1 and the transistors of the current-source converter 1. While rendering the switch S1 conducting, the control section 5 renders conducting a pair of the high-arm side transistor and the low-arm side transistor connected to any one of the input lines ACLr, ACLs, ACLt. As a result, a one-phase line current flowing through one of the input lines (for example, the input line ACLr) and the neutral phase input line ACLn is subjected to voltage doubler rectification, and supplied to the clamp capacitors Cc1, Cc2 via the resistor R1. Then, after a predetermined time period elapses, the control section 5 renders the switch S1 non-conducting.

More specifically, the control section 5 includes a power supply detection section 51 and a switching control section 52.

The power supply detection section 51 detects an AC current flowing through predetermined two phases (for example, the input lines ACLr, ACLs) of the power source E1.

The switching control section 52 gives switching signals to the transistors of the current-source converter 1.

An operation of the control section 5 in the motor driving device having such a configuration will be described. FIG. 2 is a flowchart showing an operation of the control section 5.

Firstly, in step ST1, the power supply detection section 51 receives an activation command from an external CPU for example. Then, in step ST2, the power supply detection section 51 having received the activation command detects, for example, an AC current flowing through predetermined two phases (for example, the input lines ACLr, ACLs) of the power source E1. When the power supply detection section 51 detects a proper AC current, step ST3 is performed. When the AC current is not properly detected (when no AC current is given to the current-source converter 1), an error is informed and the operation is stopped, for example.

When an operation (steps ST1, ST2 and later-described steps ST3 to ST7) for charging the clamp capacitors Cc1, Cc2 is performed with no AC current being supplied, the clamp capacitors Cc1, Cc2 are charged with no voltage. Then, when the operation mode is changed to a normal operation with the clamp capacitors Cc1, Cc2 being charged with no voltage, and an AC current is given to the current-source converter 1 in the normal operation, the current flows into the clamp capacitors Cc1, Cc2 not via the current-limiting resistor R1 because the switch S1 is not conducting in the normal operation. As a result, an inrush current flows. In the present embodiment, flowing of such an inrush current can be prevented by the operation of step ST2 mentioned above.

Then, in step ST3, the power supply detection section 51 transmits a switching signal to the switch S1 to render the switch S1 conducting.

Figure 3:
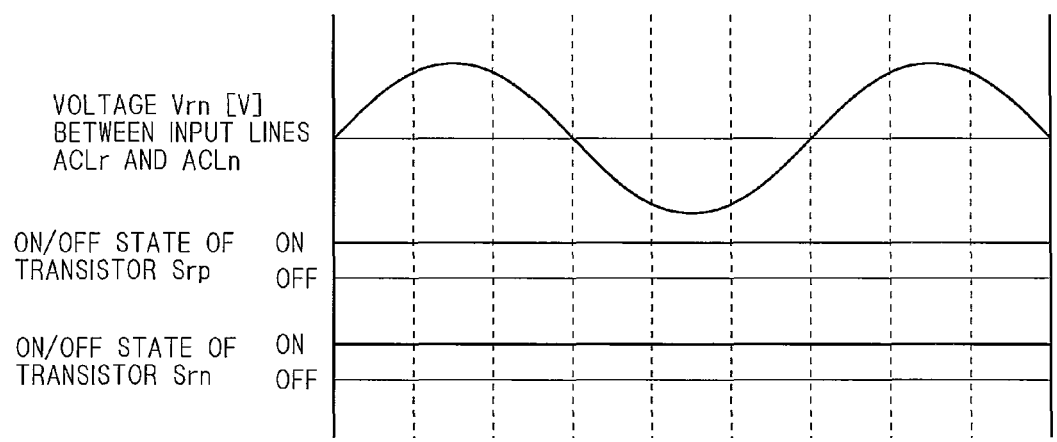
FIG. 3 is a diagram showing a voltage Vrn between an input line ACLr and a neutral phase input line ACLn, conduction/non-conduction states of a transistor Srp, and conduction/non-conduction states of a transistor Sm.

Then, in step ST4, the switching control section 52 performs voltage doubler rectification on a one-phase voltage between one of the input lines (for example, the input line ACLr) and the neutral phase input line ACLn, to serve for charging of the clamp capacitors Cc1, Cc2. Specifically, the switching control section 52 starts controlling the transistors Srp, Sm, for example. FIG. 3 is a diagram showing a voltage Vrn between the input line ACLr and the neutral phase input line ACLn, and conduction/non-conduction states of the transistors Srp, Sm. In FIG. 3, when a potential at the input line ACLr side is high, the voltage Vrn is positive.

As shown in FIG. 3, the switching control section 52 renders a pair of the transistors Srp, Sm conducting, irrespective of whether the polarity of the phase voltage Vrn is positive or negative. At this time, a circuit made up of the power source E1, the input line ACLr, the transistors Srp, Sm, the clamp capacitors Cc1, Cc2, and the neutral phase input line ACLn equivalently forms a voltage doubler rectification circuit. Since the resistor R1 is inserted in any of charging paths for charging the clamp capacitors Cc1, Cc2, a DC voltage is applied to the clamp capacitors Cc1, Cc2 via the resistor R1. This can prevent an inrush current from flowing from the power source E1 to the clamp capacitors Cc1, Cc2.

Hereinafter, the reason why the inrush current can be prevented when a current flows to the clamp capacitors Cc1, Cc2 via the resistor R1. For simplicity, a consideration will be given of a current i that flows through a circuit including a reactor L (corresponding to the reactor Lr), a resistor R (corresponding to the resistor R1), and a capacitor C (corresponding to the clamp capacitors Cc1, Cc2) which are connected in series with one another, in a case where a power supply voltage Vs (corresponding to the voltage between the input line ACLr and the neutral phase input line ACLn) is applied in series to the circuit.

Figure 4:
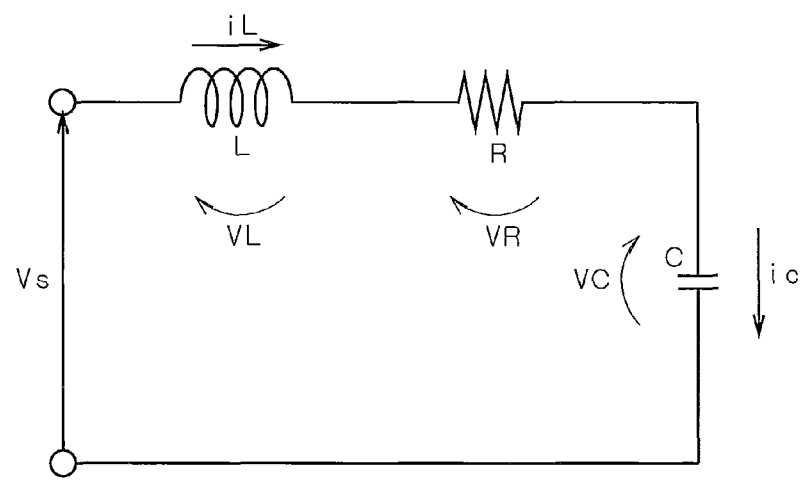
FIG. 4 is a diagram showing a circuit for the explanation of an inrush current preventing mechanism.
Figure 5:
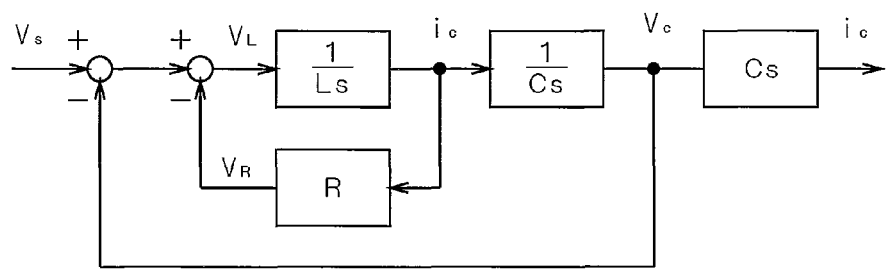
FIG. 5 is a block diagram of the circuit shown in FIG. 4.

FIG. 4 is a diagram showing the circuit. FIG. 5 is a block diagram in which an output is a current ic that flows through the capacitor C when the power supply voltage Vs is inputted.

Transmission characteristics G(s) of the current ic relative to the power supply voltage Vs are the same as those in the expression (3). By obtaining a response to a step input, the expression (4) is derived. Here, a resistance value R of the resistor R1 is large, and a transient response (in a range where s is small) is considered. Therefore, by approximating the transmission characteristics as a primary delay, the following expression is derived.

[Math. 8]

$$G(s) = \frac{D}{sE + F} = \frac{D/E}{s + F/E} \quad (8)$$

By performing an inverse Laplace transform to this, the following expression is derived.

[Math. 9]

$$ic(t) = \frac{D}{E}e^{-F/Et} \quad (9)$$

Here, D=1/L, E=R/L, and F=1/LC.

Figure 6:
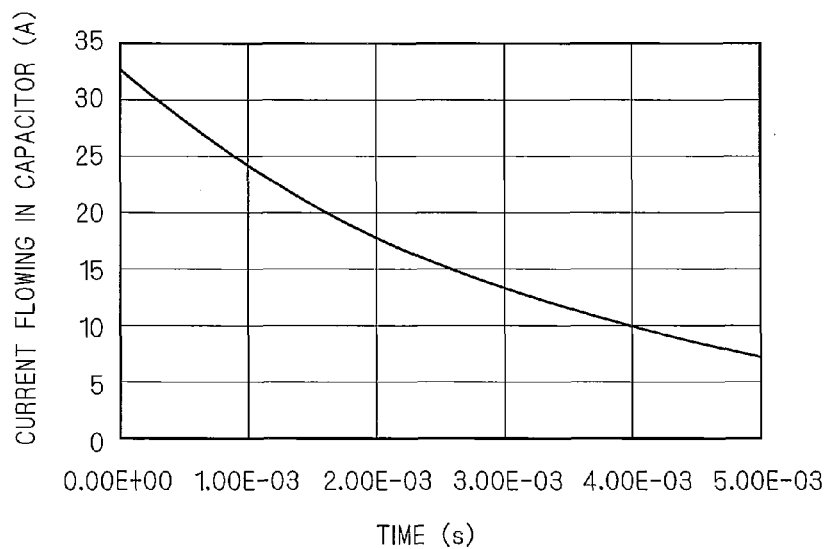
FIG. 6 is a diagram showing a response of a current flowing in a capacitor shown in FIG. 4.

FIG. 6 graphically illustrates the expression (9), and shows a relationship of a current flowing in the capacitor relative to time. FIG. 6 shows a result obtained when an inductance of the reactor L is 1 mH, an electrostatic capacitance of the capacitor C is 330 a resistance value of the resistor R is 10Ω, and the power supply voltage Vs is 400V. The maximum value of the current can be obtained by substituting t=0 into the expression (9), and ic(0)=1/R (constant). This is recognized as an inrush current, and the inrush current is a value represented by only the resistance value R. Therefore, the inrush current can be limited.

Referring to FIG. 2 again, in next step ST5, the power supply detection section 51 determines whether or not a predefined time period has elapsed after step ST4 started. When the predefined time period has not elapsed, step ST5 is performed again. When the predefined time period has elapsed, the power supply detection section 51 renders the switch S1 non-conducting in step ST6. By thus rendering the switch S1 non-conducting, the AC current from the power source E1 does not flow in the resistor R1. Therefore, after suppressing the inrush current, occurrence of a loss caused in the resistor R1 can be prevented.

In step ST4, for example, a pair of the transistors Srp, Sm are rendered conducting, and the transistors Ssp, Ssn, Stp, Stn are non-conducting. Therefore, the capacitors Cr, Cs, Ct and the clamp capacitors Cc1, Cc2 are not connected to each other. Accordingly, even when the capacitors Cr, Cs, Ct are charged, flowing of an inrush current from the capacitors Cr, Cs, Ct to the clamp capacitors Cc1, Cc2 can be prevented.

Then, in step ST7, the direct AC power converting apparatus is activated, and the operation is changed to the normal operation. More specifically, in order to switch a switching operation of the current-source converter 1 into a normal operation mode, the current-source converter 1 is reactivated, and additionally the voltage-source inverter 3 is activated. In the normal operation, the switching control section 52 gives switching signals to the transistors Srp, Srn, Ssp, Ssn, Stp, Stn to operate the current-source converter 1, so that an AC voltage inputted from the input lines ACLr, ACLs, ACLt is converted into a square-waveform DC voltage having two potentials, and the DC voltage is supplied to the DC power supply lines L1, L2. For example, the voltage-source inverter 3 operates in synchronization with the current-source converter 1, converts the square-waveform DC voltage between the DC power supply lines L1, L2 into a square-waveform AC voltage, and applies the AC voltage to the motor 4.

In step ST4, the DC voltage which has been subjected to the voltage doubler rectification is applied to the clamp capacitors Cc1, Cc2. Therefore, a voltage between both ends of a pair of the clamp capacitors Cc1, Cc2 is higher (specifically $2/\sqrt{3}$ times higher) than a voltage between both ends of a pair of the capacitors Cr, Cs, for example. Therefore, in starting the normal operation, a current initially flowing from the capacitors Cr, Cs to the clamp capacitors Cc1, Cc2 can be effectively prevented from flowing as an inrush current.

As described above, the present motor driving device can prevent an inrush current from flowing from the power source E1 to the clamp capacitors Cc1, Cc2. Moreover, in starting the normal operation, an inrush current can be effectively prevented from flowing from the capacitors Cr, Cs, Ct to the clamp capacitors Cc1, Cc2. Furthermore, it suffices that a pair of the transistors Srp, Srn are rendered conducting, and it is not necessary to perform a switching control based on a phase of the power supply voltage, for example. Therefore, the switching signal can be easily generated.

Here, a reactor is generally provided at an output of a current-source converter, and therefore a current-limiting resistor is not provided in the current-source converter. However, in a case where an AC voltage is converted into a square-waveform voltage having two potentials and the clamp capacitors Cc1, Cc2 functioning as capacitors are provided as described above, it is desired to provide a current-limiting resistor, in order to prevent a charging current which initially flows therein from flowing as an inrush current.

As another example of the direct AC power converting apparatus according to the first embodiment, a conceptual configuration of a motor driving device is shown in FIG. 7. The motor driving device shown in FIG. 7 is the same as the motor driving device shown in FIG. 1, except for the clamp circuit 2. In FIG. 7, illustration of the circuits in stages subsequent to the clamp circuit 2 is omitted.

The clamp circuit 2 includes the clamp capacitors Cc1, Cc2 and diodes D2 to D4. The clamp capacitor Cc1 is connected between the DC power supply lines L1, L2.

The clamp capacitor Cc2 is connected in series with the clamp capacitor Cc1, and provided at the DC power supply line L2 side relative to the clamp capacitor Cc1.

The diode D2 is provided between the clamp capacitors Cc1, Cc2, and has the anode thereof connected to the clamp capacitor Cc1 and the cathode thereof connected to the clamp capacitor Cc2. The diode D3 has the anode thereof connected to a point between the clamp capacitor Cc2 and the diode D2, and the cathode thereof connected to the DC power supply line L1. The diode D4 has the anode thereof connected to the DC power supply line L2, and the cathode thereof connected to a point between the clamp capacitor Cc1 and the diode D2.

In the clamp circuit 2 of this type, when a current flowing in the motor 4 delays behind a voltage between the DC power supply lines L1, L2 due to a load power factor at the voltage-source inverter 3 side, a return current flows from the motor 4 to the DC power supply lines L1, L2 in a predetermined time period, and the clamp capacitors Cc1, Cc2 are charged in a state of being connected in series with each other. A charging voltage (a voltage between both ends of a pair of the clamp capacitors Cc1, Cc2) at this time is also determined based on the load power factor. On the other hand, when the voltage between both ends of each of the clamp capacitors Cc1, Cc2 rises above the lower voltage of the square-waveform DC voltage between the DC power supply lines L1, L2, the clamp capacitors Cc1, Cc2 are discharged in a state of being connected in parallel with each other. Since the clamp capacitors Cc1, Cc2 are charged in the state of being connected in series with each other and discharged in the state of being connected in parallel with each other, the discharging voltage is ½ of the charging voltage.

Due to such a charging/discharging operation, the voltages of the clamp capacitors Cc1, Cc2 act to obtain equilibrium, in a case where a discharging current is larger than a charging current.

As described above, the return current from the motor 4 can be charged, and discharged again to be supplied to the motor 4 again. Therefore, the motor 4 can be efficiently driven. Moreover, since the clamp circuit 2 does not require a so-called active device such as a switching element, power consumption and manufacturing costs can be reduced.

Second Embodiment

Figure 8:
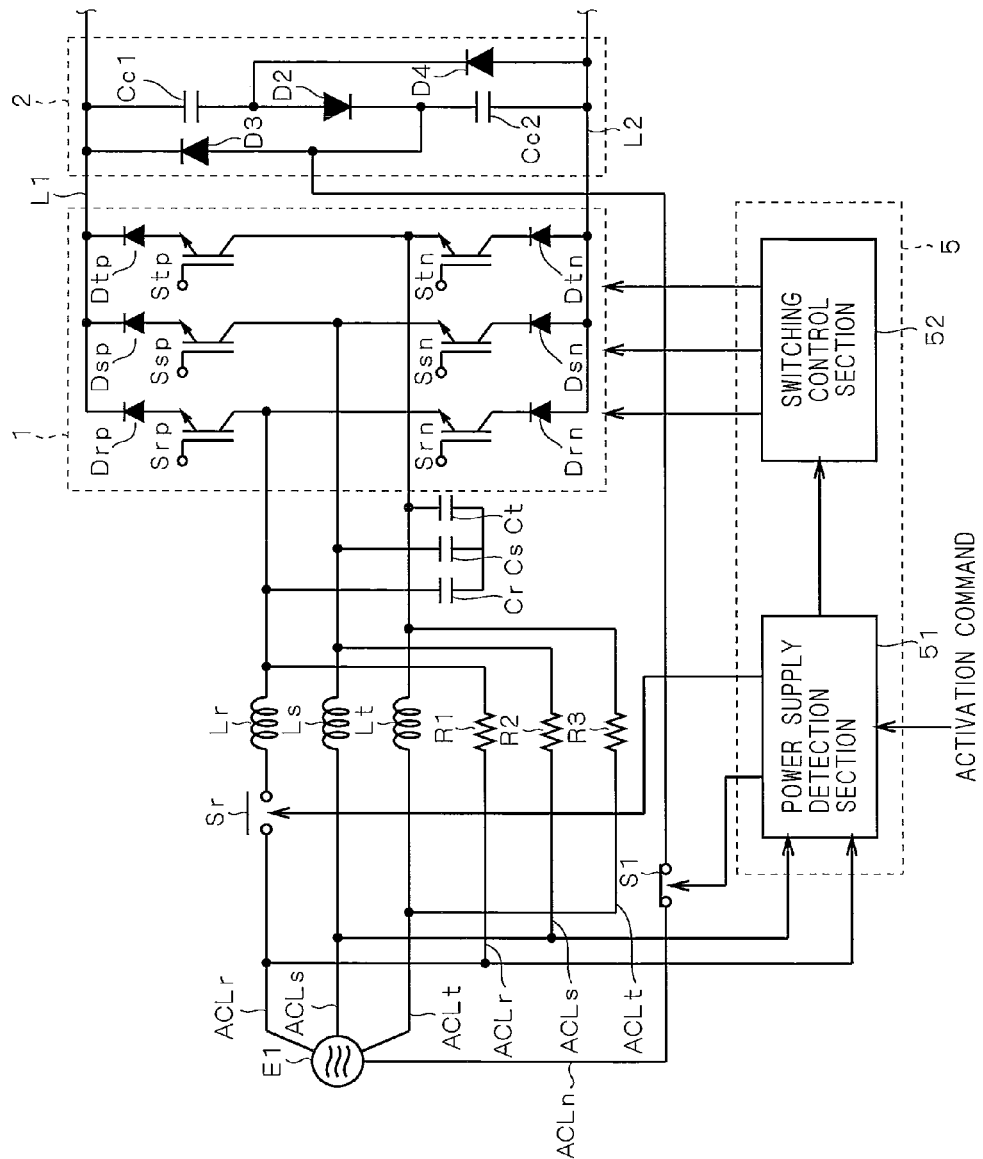
FIG. 8 is a diagram conceptually showing a configuration of a motor driving device according to a second embodiment.

As an example of a direct AC power converting apparatus according to a second embodiment, a conceptual configuration of a motor driving device is shown in FIG. 8. The conceptual configuration of the present motor driving device is the same as that of the motor driving device shown in FIG. 7, except for resistors R1 to R3 and an auxiliary switch Sr. In FIG. 8, illustration of the circuits in stages subsequent to the clamp circuit 2 is omitted. A mode of the clamp circuit 2 may be the one shown in FIG. 1.

The resistors R1 to R3 are inserted in the input lines ACLr, ACLs, ACLt, respectively. The auxiliary switch Sr is connected in series with any of the reactors Lr to Lt. In an exemplary mode illustrated in FIG. 8, the auxiliary switch Sr is connected in series with the reactor Lr. The reactors Ls, Lt are connected in parallel with the resistors R2, R3, respectively. A pair of the auxiliary switch Sr and the reactor Lr are connected in parallel with the resistor R1.

The power supply detection section 51 can control a selection operation of the auxiliary switch Sr.

In the motor driving device of this type, an operation of the control section 5 is the same as the operation shown in the flowchart of FIG. 2, except for step ST6. In step ST6, the power supply detection section 51 renders the switch S1 non-conducting, and renders the auxiliary switch Sr conducting. In step ST4, the switching control section 52 preferably outputs switching signals to the current-source converter 1 as shown in FIG. 3.

The switch S1 is rendered conducting in step ST3, and at the time when the current-source converter 1 is controlled in step ST4, the auxiliary switch Sr is non-conducting. Therefore, the AC current flowing in the input line ACLr and the neutral phase input line ACLn inevitably flows through the resistor R1. Thus, flowing of an inrush current to the clamp capacitors Cc1, Cc2 can be effectively prevented. It may also be acceptable that the auxiliary switch Sr is not provided and a part of the AC current flowing in the input line ACLr and the neutral phase input line ACLn flows to the clamp capacitors Cc1, Cc2 via the reactor Lr. In this case as well, since another part of the AC current goes through the resistor R1, the inrush current can be reduced. Moreover, as for the AC current going through the reactor Lr, the inrush current can be also reduced by a resistor component of the reactor Lr, for example.

In a carrier current component removal filter made up of the reactors Lr, Ls, Lt and the capacitors Cr, Cs, Ct, the resistors R1 to R3 can improve input/output transient characteristics of the capacitors Cr, Cs, Ct. In the following, a specific description will be given.

Figure 9:
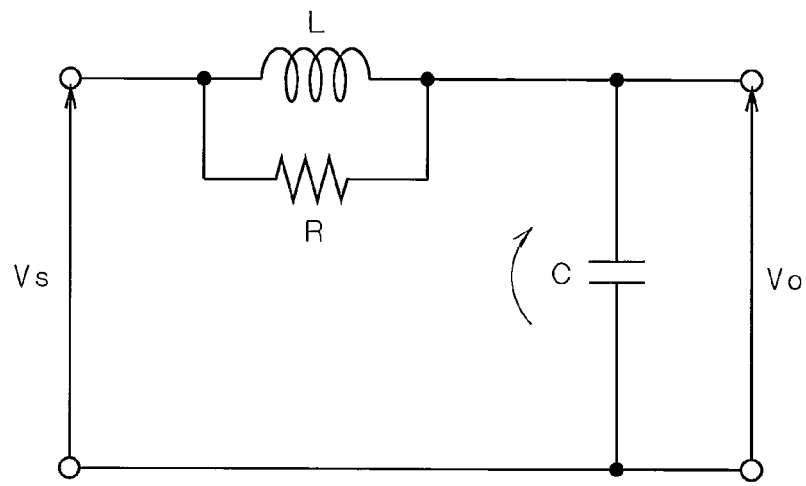
FIG. 9 is a diagram showing a circuit for the explanation of a capacitor-input-characteristics improving mechanism.

For simplicity, a consideration will be given of a case where the power supply voltage Vs is inputted to, as a one-phase circuit, a circuit in which the capacitor C (corresponding to the capacitors Cr, Cs, Ct) is connected in series with a pair of the reactor L (corresponding to the reactors Lr, Ls, Lt) and the resistor R (corresponding to the resistors R1 to R3) which are connected in parallel with each other. FIG. 9 is a diagram showing a configuration of the circuit. In the circuit, when the power supply voltage Vs is inputted, a voltage Vo between both ends of the capacitor C is recognized as an output. A transfer function of the voltage Vo between both ends of the capacitor C relative to the power supply voltage Vs is as follows.

[Math. 10]

$$G(s) = \frac{Vc}{Vs} = (sL/R+1)\frac{1/LC}{s^2 + s/CR + 1/LC} \qquad (10)$$

In this transfer function, undamped natural frequencies f1 and f2 and a damping coefficient ξ are represented by the following expression.

[Math. 11]

$$f_1 = \frac{1}{2\pi L/R}, \quad f_2 = \frac{1}{2\pi\sqrt{LC}}, \quad \xi = \frac{1}{2R}\sqrt{\frac{L}{C}} \qquad (11)$$

Figure 10:
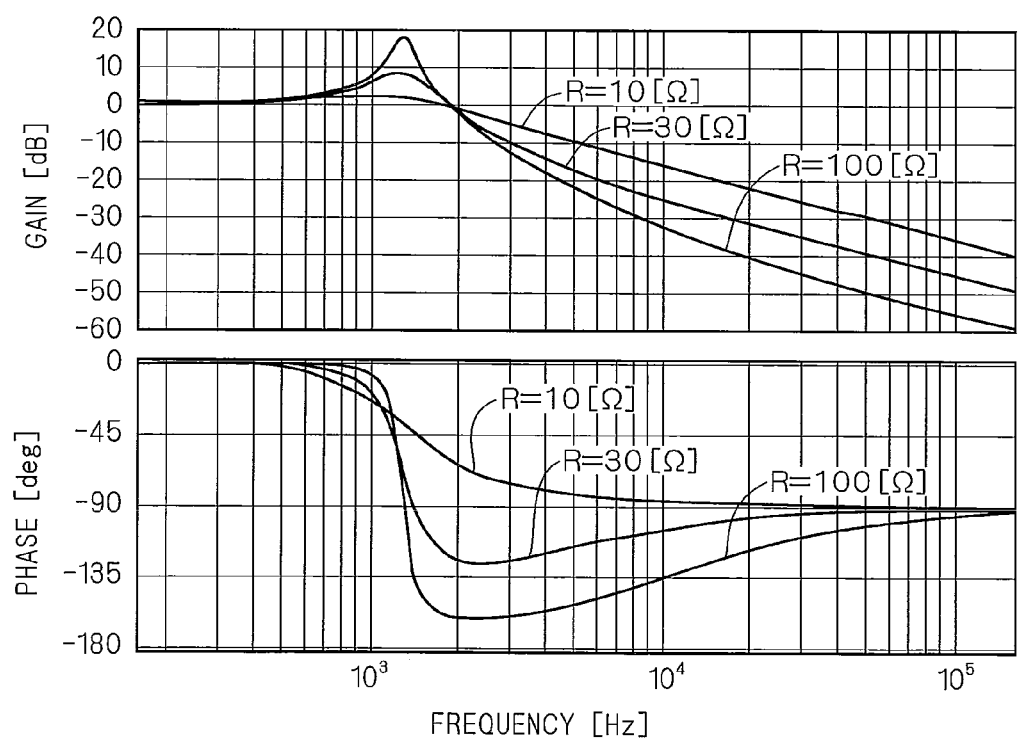
FIG. 10 is a Bode diagram of the circuit shown in FIG. 12.

FIG. 10 is a Bode diagram showing frequency characteristics of the transfer function. FIG. 10 shows results which are obtained in three cases where a resistance value of the resistor R is 10Ω, 30Ω, and 100Ω, where an inductance of the reactor L is 1.5 mH and an electrostatic capacitance of the capacitor C is 10 μF.

Figure 11:
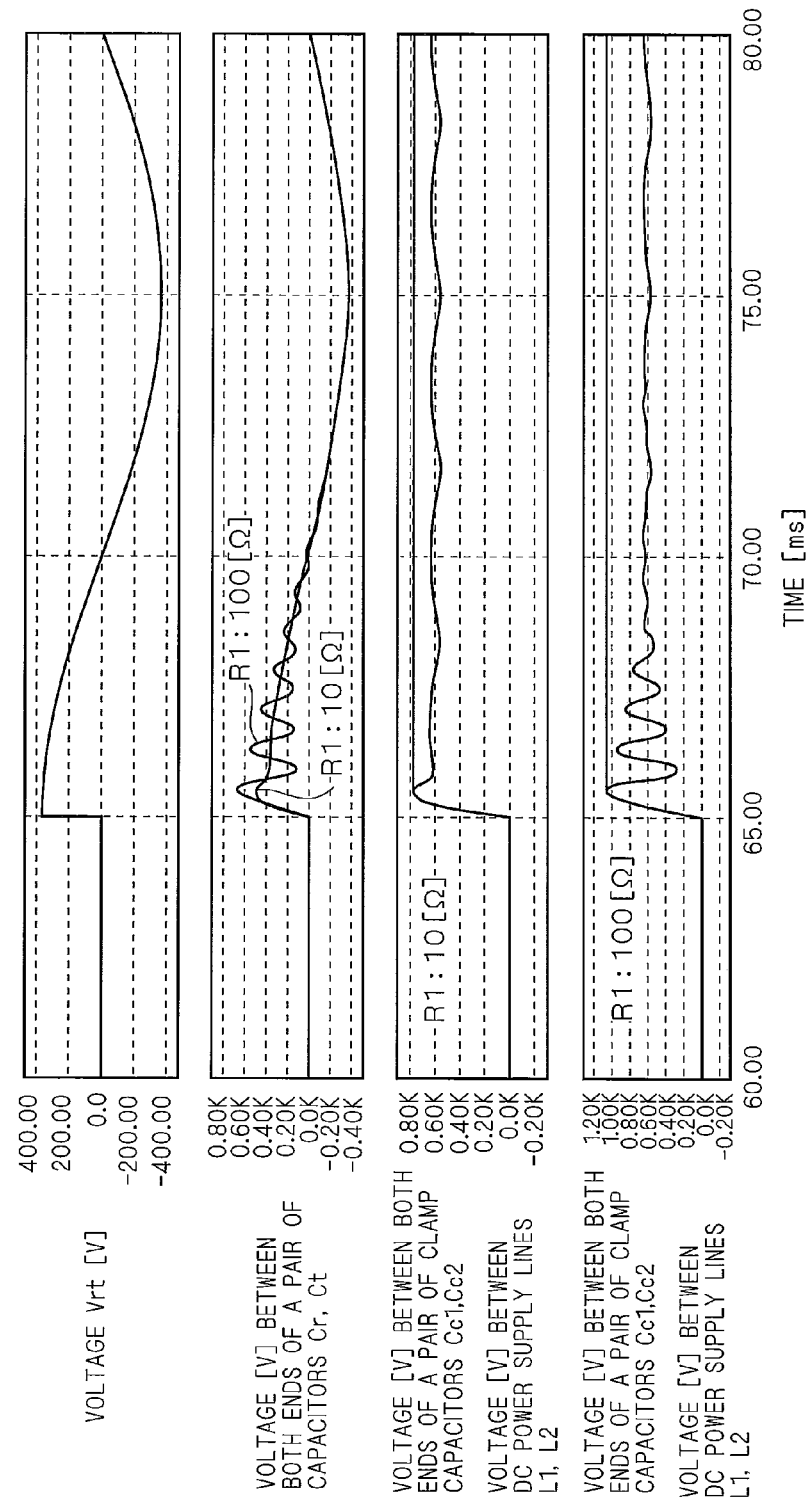
FIG. 11 is a diagram showing a voltage between input lines ACLr and ACLs, a voltage between both ends of a pair of capacitors Cr, Ct, a voltage between both ends of a pair of clamp capacitors Cc1, Cc2, and a voltage between DC power supply lines L1, L2.
Figure 12:
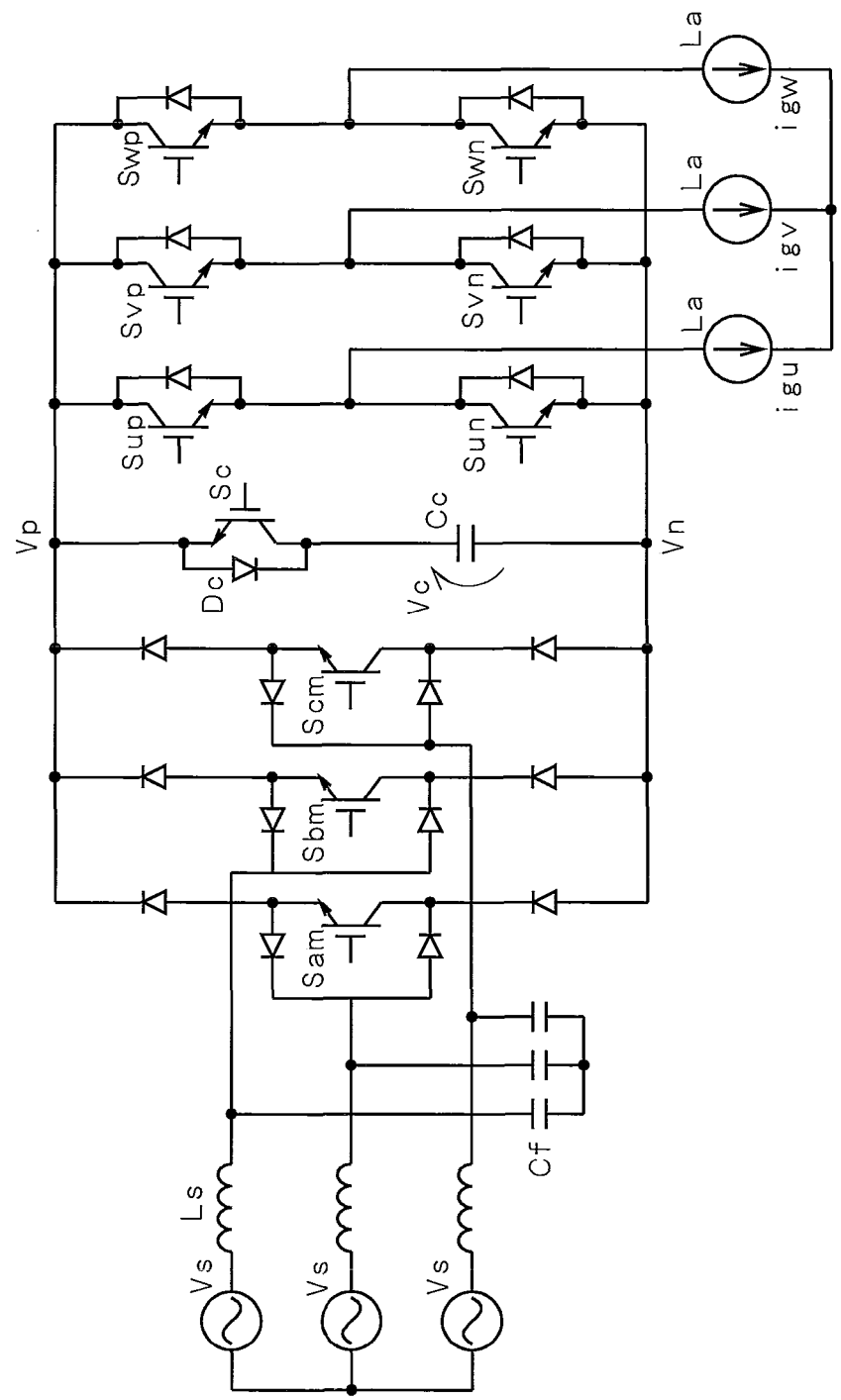
FIG. 12 is a diagram showing a configuration of a power converting apparatus according to Lixiang Weigh, and Thomas A. Lipo, "Investigation of 9-switch Dual-bridge Matrix Converter Operating under Low Output Power Factor", U.S.A., IEEE ISA2003, vol. 1, pp. 176-181.
Figure 13:
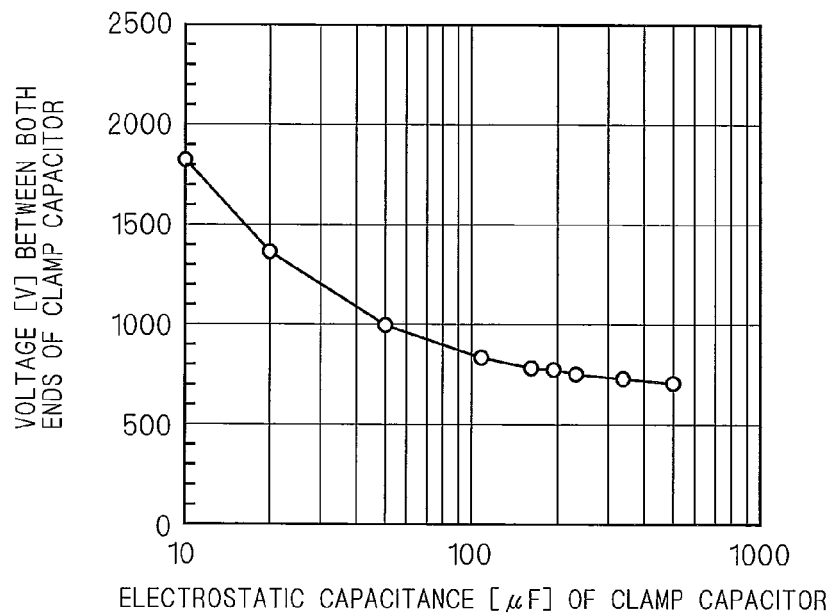
FIG. 13 is a graph showing a relationship between an electrostatic capacitance of a clamp capacitor and a voltage between both ends of the clamp capacitor.
Figure 14:
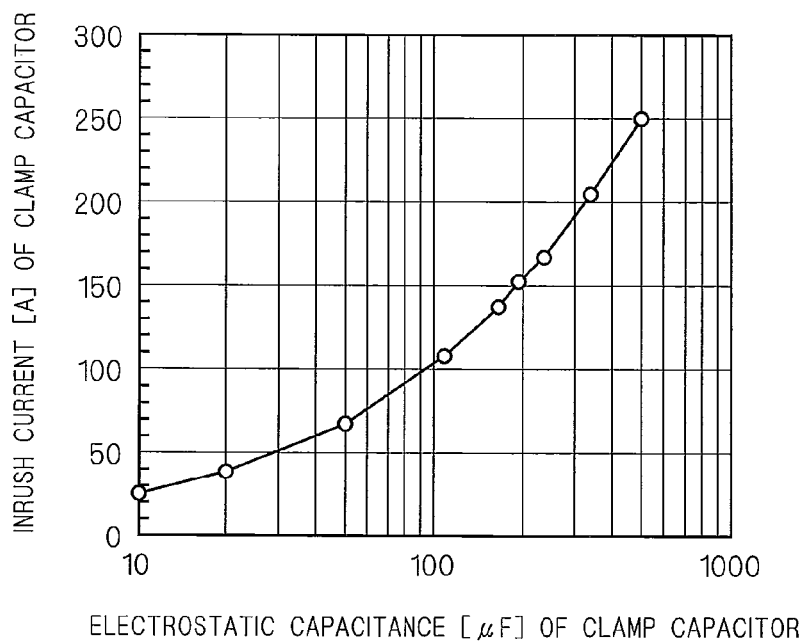
FIG. 14 is a graph showing a relationship between the electrostatic capacitance of the clamp capacitor and an inrush current of the clamp capacitor.

FIG. 11 shows a voltage Vrt, a voltage between both ends of a pair of the capacitors Cr, Ct, a voltage between both ends of a pair of the clamp capacitors Cc1, Cc2, and a voltage between the DC power supply lines L1, L2, in the motor driving device of FIG. 8 using the carrier current component removal filter as described above. Note that FIG. 11 shows results obtained when the resistance value of the resistor R1 is 10Ω and 100Ω.

As shown in FIG. 11, damping is produced by the resistance value of the resistor R1, whereby it is possible to reduce a voltage (transient voltage) applied to each of the capacitors Cr, Ct and the clamp capacitors Cc1, Cc2 in a transient period (see the results obtained when the resistance value is 10Ω and 100Ω).

Compared with the inrush current shown in FIG. 6, it is possible to reduce the inrush current and also reduce the transient voltages of the capacitors Cr, Cs, Ct if the resistance value is approximately 10Ω.

While the invention has been described in detail, the foregoing description is in all aspects illustrative and not restrictive. It is therefore understood that numerous modifications and variations can be devised without departing from the scope of the invention.

The invention claimed is:

1. A direct AC power converting apparatus, comprising:
a plurality of input lines to which an output of a multi-phase AC power source including a neutral point is given;
a positive-side DC power supply line;
a negative-side DC power supply line to which applied is a potential lower than a potential applied to said positive-side DC power supply line;
a current-source power converter that: includes high-arm side switching elements and low-arm side switching elements, each of said high-arm side switching elements having a reverse blocking capability and being connected between said positive-side DC power supply line and corresponding one of said input lines, each of said low-arm side switching elements having a reverse blocking capability and being connected between said negative-side DC power supply line and corresponding one of said input lines; converts a multi-phase AC voltage applied between ones of said input lines into a square-waveform DC voltage having two potentials by a selection operation of said high-arm side switching elements and said low-arm side switching elements; and supplies said DC voltage to between said positive-side DC power supply line and said negative-side DC power supply line;
a plurality of input capacitors provided between the ones of said input lines and functioning as a voltage source;
a first diode provided between said positive-side DC power supply line and said negative-side DC power supply line, and having an anode at a said positive-side DC power supply line side and a cathode at a said negative-side DC power supply line side;
first and second capacitors connected, between said positive-side DC power supply line and said negative-side DC power supply line, in series with said first diode;
a neutral phase input line that connects said neutral point and a point between said first capacitor and said second capacitor;
a switch inserted in said neutral phase input line;
a voltage-source power converter that converts said DC voltage into a square-waveform AC voltage and outputs the AC voltage to an inductive multi-phase load;
a resistor inserted in any one of said plurality of input lines and said neutral phase input line; and
a control section that renders conducting said high-arm side switching element and said low-arm side switching element which are connected to the same one of said input lines while said switch is conducting, to serve for charging of said first capacitor and said second capacitor via said resistor, and renders said switch non-conducting after a predetermined time period elapses.

2. The direct AC power converting apparatus according to claim 1, wherein said resistor is provided on said neutral phase input line.

3. The direct AC power converting apparatus according to claim 1, wherein
said resistor is provided on one of said input lines, and
said direct AC power converting apparatus further comprises a reactor connected in parallel with said resistor.

4. The direct AC power converting apparatus according to any one of claims 1 to 3, wherein
said first capacitor is provided at a said positive-side DC power supply line side relative to said second capacitor, and said first diode is provided between said first capacitor and said second capacitor,
said direct AC power converting apparatus further comprises:
a second diode having an anode connected to a point between said first diode and said second capacitor, and a cathode connected to said positive-side DC power supply line; and a third diode having an anode connected to said negative-side DC power supply line, and a cathode connected to a point between said first diode and said first capacitor.

5. The direct AC power converting apparatus according to claim 2, wherein
    said first capacitor is provided at a said positive-side DC power supply line side relative to said second capacitor, and said first diode is provided between said first capacitor and said second capacitor,
    said direct AC power converting apparatus further comprises:
        a second diode having an anode connected to a point between said first diode and said second capacitor, and a cathode connected to said positive-side DC power supply line; and
        a third diode having an anode connected to said negative-side DC power supply line, and a cathode connected to a point between said first diode and said first capacitor.

6. The direct AC power converting apparatus according to claim 3, wherein
    said first capacitor is provided at a said positive-side DC power supply line side relative to said second capacitor, and said first diode is provided between said first capacitor and said second capacitor,
    said direct AC power converting apparatus further comprises:
        a second diode having an anode connected to a point between said first diode and said second capacitor, and a cathode connected to said positive-side DC power supply line; and
        a third diode having an anode connected to said negative-side DC power supply line, and a cathode connected to a point between said first diode and said first capacitor.

* * * * *